United States Patent [19]

Ishiguro

[11] 4,027,100

[45] May 31, 1977

[54] CODE TRANSMISSION SYSTEM HAVING BUFFERS OF APPROXIMATELY EQUAL CAPACITIES ON BOTH TRANSMITTING AND RECEIVING SIDES

[75] Inventor: Tatsuo Ishiguro, Tokyo, Japan

[73] Assignee: Nippon Electric Company, Ltd., Tokyo, Japan

[22] Filed: Feb. 13, 1976

[21] Appl. No.: 657,799

[30] Foreign Application Priority Data

Feb. 13, 1975 Japan .............................. 50-18500

[52] U.S. Cl. ................................. 178/69.1; 178/68
[51] Int. Cl.² ....................................... H04W 7/04
[58] Field of Search ........ 179/15 A, 15 AF, 15 BV, 179/15.5 S; 178/DIG. 3, 53, 68, 69.5 R; 325/38

[56] References Cited

UNITED STATES PATENTS 3,922,494  11/1975  Cooper et al. .................. 179/15 A
3,946,161  3/1976  Husted et al. ................. 179/15 AF

*Primary Examiner*—Benedict V. Safourek
*Attorney, Agent, or Firm*—Sughrue, Rothwell, Mion, Zinn & Macpeak

[57] ABSTRACT

A buffer memory of a transmitter stores, for transmission at a predetermined transmission rate, synchronization codes produced regularly, buffer occupancy codes immediately following the respective synchronization codes, and information codes produced between each buffer occupancy code and the next following synchronization code unevenly in response to information to be transmitted. A buffer memory of a receiver stores the codes transmitted from the transmitter. A decoder, coupled to the receiver buffer memory, decodes the information codes at a decoding rate controlled with reference to the difference between an actual sum of buffer occupancies of both buffer memories and a value predetermined for the sum.

5 Claims, 3 Drawing Figures

CODE TRANSMISSION SYSTEM HAVING BUFFERS OF APPROXIMATELY EQUAL CAPACITIES ON BOTH TRANSMITTING AND RECEIVING SIDES

BACKGROUND OF THE INVENTION

This invention relates to a code transmission system in which each of a transmitter and a receiver or receivers comprises a buffer memory for temporarily storing codes to be transmitted or codes received from the transmitter.

In some types of code transmission system, use is made of variable length codes. Examples are variable-length differential pulse-code-modulating and interframe coding systems for use in raising the efficiency of television signal transmission. In a transmitter for such a system, information to be transmitted is encoded into information codes at a predetermined sampling rate. For television signals, the sampling rate is linearly proportional to the speed of scanning. In some other cases, fixed length information codes are produced at an irregular rate. In either case, the information codes as produced are irregularly or unevenly distributed with respect to time. It is therefore next to mandatory to temporarily store the information codes in a buffer memory of the transmitter to transmit the information codes and some other indispensable codes at a predetermined transmission or bit rate. In a receiver of the system, the codes transmitted from the transmitter are temporarily stored in a buffer memory of the receiver and subsequently read out thereof to be pertinently decoded. The transmission rate is generally independent of the sampling rate.

In code transmission systems of the type described, it is impossible to carry out pertinent decoding unless the information codes are decoded at the sampling rate. This is because the buffer memory of the receiver otherwise either overflows or underflows. A system of the type described has already been proposed wherein specific codes of a predetermined code pattern, which may be called synchronization codes, are transmitted from the transmitter at a regular interval at least as a part of the other indispensable codes. In television signal transmission, the synchronization codes may be produced at the instants of the field synchronizing signals. Even with this proposed system, the buffer memory of the receiver must have a capacity sufficiently larger than that of the buffer memory of the transmitter in order to prevent the undesirable overflow or underflow which might otherwise occur due to uncertainty of the time at which the decoding begins.

SUMMARY OF THE INVENTION

It is therefore an object of the present invention to provide a code transmission system of the type described, wherein it is possible to reduce the degree of uncertainty of the time at which decoding begins in a receiver.

It is another object of this invention to provide a code transmission system of the type described, wherein a receiver operates with a suitable amount of codes always stored in a buffer memory.

It is still another object of this invention to provide a code transmission system of the type described, wherein the buffer memory of the receiver need not have a capacity sufficiently larger than that of the buffer memory of the transmitter.

It is yet another object of this invention to provide a code transmission system of the type described, wherein it is sufficient that the buffer memory of the receiver has an approximately equal capacity as the buffer memory of the transmitter.

A code transmission system of the type described comprises a transmitter and a receiver. The transmitter comprises synchronization means for producing synchronization codes of a predetermined code pattern regularly with respect to time, encoder means coupled to the synchronization means and responsive to information to be transmitted for successively producing information codes representative of the information between two adjacent synchronization codes, a first buffer memory for storing codes supplied thereto, first means coupled to the synchronization and the encoder means and to the first buffer memory for supplying the synchronization and the information codes from the synchronization and the encoder means to the first buffer memory, means coupled to the first buffer memory for reading the codes stored in the first buffer memory to transmit the read out codes at a predetermined transmission rate, and second means coupled to the first buffer memory for producing a first buffer occupancy code indicative of buffer occupancy of the first buffer memory. The receiver comprises a second buffer memory for storing the codes transmitted from the transmitter, decoder means for decoding, at a decoding rate, information codes supplied thereto into an output signal, third means coupled to the second buffer memory and to the decoder means for reading the synchronization and the information codes stored in the second buffer memory to supply the read out information codes to the decoder means thereby making the output signal represent the information mentioned above, and fourth means coupled to the second buffer memory for producing a second buffer occupancy code indicative of buffer occupancy of the second buffer memory.

In accordance with this invention, the transmitter further comprises fifth means coupled to the first and the second means and to the first buffer memory for supplying the first buffer occupancy codes from the second means to the first buffer memory in a predetermined relation to the synchronization codes supplied from the synchronization means to the first buffer memory. The receiver further comprises sixth means coupled to the third means for reading the first buffer occupancy codes stored in the second buffer memory, seventh means coupled to the sixth and the fourth means and responsive to the first buffer occupancy codes supplied from the sixth means and to the second buffer occupancy codes supplied from the fourth means for producing, when the buffer occupancy indicated by the supplied second buffer occupancy codes has a difference from a predetermined value, a control signal of an amplitude representative of the difference, and eight means coupled to the seventh means and to the decoder means and responsive to the amplitude of the control signal for controlling the decoding rate.

DESCRIPTION OF THE PREFERRED EMBODIMENT

Figure 1:
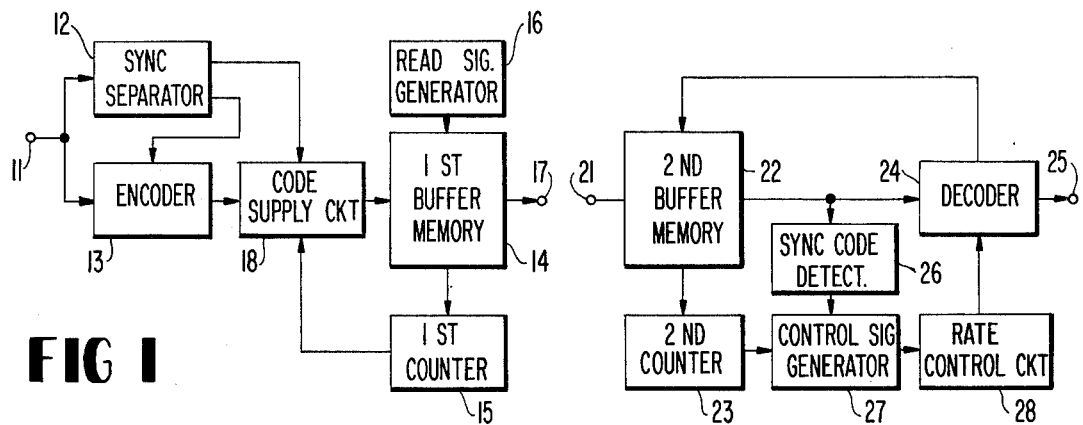
FIG. 1 is a block diagram of a code transmission system adapted to television signal transmission according to a preferred embodiment of the instant invention.
Figure 2:
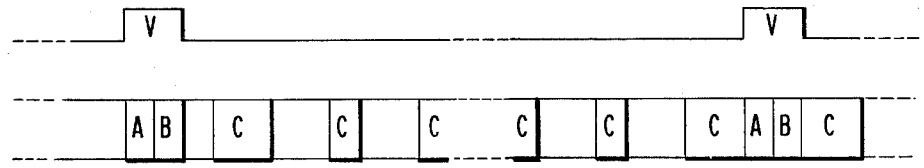
FIG. 2 shows, by way of example, a series of vertical synchronizing signals of a television signal and another series of synchronization codes, buffer occupancy codes, and information codes as produced for a television signal in a transmitter of the code transmission system illustrated in FIG. 1.

Referring to FIGS. 1 and 2, a transmitter of a code transmission system according to a preferred embodiment of the present invention is for a television signal comprising, in turn, vertical synchronizing signals V at a regular interval, horizontal synchronizing signals (not shown) equally distributed with respect to time between two adjacent vertical synchronizing signals, and an analog information signal (not shown) which follows each horizontal synchronizing signal and represents a flow of picture elements along a horizontal scanning line. The transmitter comprises an input terminal 11 to which the television signal is supplied, a synchronizing signal separator 12 responsive to the television signal supplied from the input terminal 11 for separating the synchronizing signals from the supplied television signal, an encoder 13 responsive to the synchronizing signals supplied from the separator 12 for encoding the information signals in the television signal supplied from the input terminal 11 into variable length information codes at a predetermined sampling rate synchronized with the horizontal synchronizing signals, and a first buffer memory 14 for temporarily storing codes supplied thereto. The buffer memory 14 is accompanied by a first counter 15 for producing a first buffer occupancy code indicative of buffer occupancy of the buffer memory 14 and by a reading signal generator 16 for reading the codes stored in the buffer memory 14 to transmit the read out codes from an output terminal 17 at a predetermined transmission or bit rate, such as 6.3 Mb/s, to a receiver or receivers of the system through a transmission line (not shown) which may be a radio channel. The transmitter further comprises a code supplying circuit 18 responsive to the vertical synchronizing signals supplied from the separator 12 for supplying the buffer memory 14 with the information codes from the encoder 13, a synchronization code produced for each vertical synchronizing signal, and a buffer occupancy code produced by the counter 15 at the instant of each vertical synchronizing signal. As best shown in FIG. 2, it is preferred that each synchronization code A is immediately followed by a buffer occupancy code B. Information codes C as produced by the encoder 13 appear at the sampling rate and may have different lengths according to the information to be transmitted.

Further referring to FIG. 1, a receiver of the code transmission system being illustrated comprises an input terminal 21 supplied with the codes transmitted from the transmitter, a second buffer memory 22 for temporarily storing the codes supplied from the input terminal 21, a second counter 23 accompanying the buffer memory 22 for producing a second buffer occupancy code indicative of buffer occupancy of the buffer memory 22, and a decoder 24 for decoding the codes supplied from the buffer memory 22. Inasmuch as the codes stored in the buffer memory 22 are of variable lengths, it will readily be understood that the codes must be supplied from the buffer memory 22 to the decoder 24 at relevant instants. Furthermore, the decoder 24 must decode the information codes at the sampling rate used in the encoder 13 and with correct phase relation to the synchronization codes read out of the buffer memory 22 to supply a reproduced television signal to an output terminal 25. The codes stored in the buffer memory 22 are therefore read out thereof in response to reading signals fed back thereto at the sampling rate from the decoder 24. The decoder 24 begins its operation when the second buffer occupancy code indicates that a relevant number of codes are stored in the buffer memory 22.

As illustrated in FIG. 1, the receiver further comprises a synchronization code detector 26 for detecting the synchronization codes read out of the second buffer memory 22 and successively identifying and retaining the first buffer occupancy codes which are read out of the buffer memory 22 following the respective synchronization codes, a control signal generator 27 responsive to the first buffer occupancy code supplied from the detector 26 and to the second buffer occupancy code supplied from the second counter 23 for producing a control signal of an amplitude representative of a difference between the buffer occupancy of the second buffer memory 22 and a predetermined pertinent buffer occupancy thereof, and a rate control circuit 28. Although not shown in FIG. 1, the rate control circuit 28 comprises, in turn, a clock for supplying clock pulses to the decoder 24 at a repetition rate equal to the sampling rate for encoding, synchronizing signal producing means responsive to the clock pulses for supplying synchronizing signals to the decoder 24 with a phase relation to the synchronization codes read out of the buffer memory 22, and means for controlling the phase relation and the repetition rate or frequency. It sould be mentioned here, as described in "An Adaptive Dual-Mode Coder/Decoder for Television Signals" by H. Frei et al., IEEE Trans., COM-19, 6(December, 1971), p. 933, that a sum of the buffer occupancy of the first buffer memory 14 at a first instant and that of the second buffer memory 22 at a second instant later than the first instant by the time of travel of a code from the first buffer memory 14 to the second 22 is a constant when no error occurs in the codes transmitted through the transmission line. The control signal generator 27 produces the control signal with reference to this constant of the sum. The phase control carried out in the control circuit 28 is for reducing that large difference between the pertinent buffer occupancy of the second buffer memory 22 and the actual buffer occupancy thereof which might otherwise last at the beginning of decoding and appear when an error occurs in the codes transmitted through the transmission line. The frequency control is for correcting that small difference (usually, of the order of $10^{-3}$ to $10^{-4}$ percent) of the sampling rate of decoding with respect to the sampling rate of encoding which may occur during continued operation. Preferably, the frequency control is carried out by an integrated signal obtained by integrating the difference represented by the amplitude of the control signal. At any rate, the rate of decoding, including in a broader sense the phase relation, is controlled by the control signal.

It will now be understood that this invention is equally well applicable to a code transmission system of any one of the types described in the instant specification, such as a code transmission system whrein fixed length codes are produced at a varying sampling rate. If use is made of two or more sorts of synchronizing signals, the phase control should be carried out to the synchorizing singnals corresponding to the synchronization codes. The synchronizing signal generator 12 serves in cooperation with a portion of the code supplying circuit 18 as synchronization means for producing synchronization codes of the pretetermined code pattern reqularly with respect to time. Under the circumstances, the encoder 13 is operatively coupled to the synchronization means and may be encoder means including means (not shown) operatively coupled to the synchronization means and responsive to the synchronization codes for producing clock pulses that specify the sampling rate. The counter 15 and 23 as called hereinabove may comprise means for calculating a difference between the bits read into the buffer memory 14 or 22 and the bits read out thereof. In the embodiments illustrated with reference to FIG. 1, the fifth means mentioned in the preamble is included in the codes supplying circuit 18 and coupled to the same circuit 18 for supplying the synchronization and the information codes from the synchronization and the encoder means to the first buffer memory 14. Once the synchronization codes stored in the second buffer memory 22 of the receiver are read out, it is readily possible for the sixth means included in the synchronization code detector 26 to identify the first buffer occupancy codes with reference to the predetermined relation given on the transmitting side to the first buffer occupancy codes relative to the synchronization codes. It will also be seen that the amplitude of the control signal may be said to represent a difference between the actual buffer occupancy of the second buffer memory 22 and a pertinent buffer occupancy thereof. Inasmuch as the buffer occupancy of the second buffer memory 22 is controlled so as not to overflow, it is possible in accordance with this invention to make second buffer memory 22 have not a capacity sufficiently larger than that of the first buffer memory 14 but have a capacity approximately equal to the latter.

Figure 3:
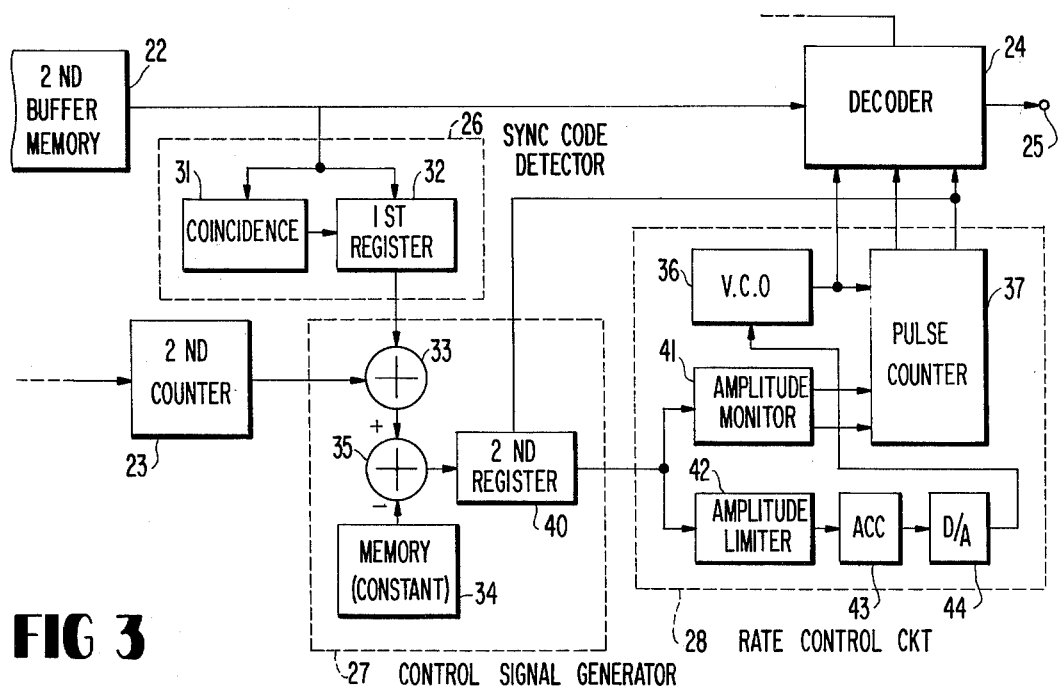
FIG. 3 is a partial block diagram of a receiver for a code transmission system according to a specific embodiment of the invention.

Referring now to FIG. 3, a receiver of a code transmission system according to a specific embodiment of this invention comprises a second buffer memory 22, a second counter 23, a decoter 24, and other circuit elements illustrated with reference to FIG. 1. The receiver further comprises a synchronization code detector 26 comprising, in turn, a coincidence circuit 31 retaining the predetermined code pattern for identifying the synchronization codes read out of the second buffer memory 22 to produce a detection signal at an instant related by the above-mentioned predetermined relation to the detection of each synchronizing code, and a first register 32 responsive to the detection signals supplied from the coincidence circuit 31 for successively storing the first buffer occupancy codes read out of the buffer memory 22. A control signal generator 27 of the receiver comprises an adder 33 for calculating a sum of the buffer occupancy indicated by a first buffer occupancy code supplied from the first register 32 and that indicated by a second buffer occupancy code supplied from the second counter 23, a memory 34 retaining a code representative of the above-mentioned constant, and a subtractor 35 for deriving a control signal of an amplitude representative of a difference between the sum calculated by the adder 33 and the constant retained by the memory 34. For simplicity of description, it is surmised that the subtractor 35 subtracts the constant from the sum so that the amplitude of the control signal goes positive and negative when the buffer occupancy of the second buffer memory 22 becomes greater and smaller, respectively, than the pertinent buffer occupancy. A rate control circuit 28 of the receiver comprises a voltage-controlled oscillator 36 serving as a clock for supplying clock pulses to the decoder 34 to define the sampling rate of decoding, and a pulse counter 37 for supplying synchronizing signals to the decoder 24 each time when the counter 37 counts a predetermined number or count. For a television signal, the counter 37 consists of two portions for producing the horizontal and vertical synchronizing signals. The control signal generator 27 further comprises a second register 40 for storing the control signal in response to each of the vertical synchronizing signals supplied from the rate control circuit 28.

As depicted in FIG. 3, the rate control circuit 28 further comprises an amplitude monitor 41 retaining a positive and a negative reference amplitude for producing a first and a second control output when the amplitudes of the control signals exceed in absolute values the positive and negative reference amplitudes, respectively, and connections for supplying the control outputs to the pulse counter 37. Under the circumstances surmised above, the positive and negative control ouuputs in effect reduces and increases, respectively, the predetermined count for the vertical synchronizing signals. A decrease and an increase in effect of the predetermined count may be carried out be addition and subtraction, respectively, of the count besides that progress of the count which is caused by the clock pulses. Alternatively, alteration in effect of the predetermined count may be performed by resetting the pulse counter 37 at a relevant instant. With a decrease in the predetermined count, the pulse counter 37 produces a vertical synchronizing signal at an earlier instant. As a result, the decoder 24 supplies the reading signals to the buffer memory 22 at a faster rate until the next following synchronization code is read out whereby the pulse counter 37 eventually produces the synchronizing signals in phase with the read out synchronization codes. With an increase in te predetermined count, the pulse counter 37 produces a synchronizing signal at a later instant. The decoder 24 produces no reading signals until the next following synchronization code is read out of the buffer memory 22, when the decoder 24 again produces the reading signals at the sampling rate. In either event, it may be said that the rate of decoding is zero. The amplitude monitor 41 and the connections cooperate to serve as counter means responsive to the clock pulses for supplying the decoder 24 with synchronizing signals having a phase relation controlled by the amplitude of the control signal relative to the synchronization codes read out of the second buffer memory 22. The rate control circuit 28 still further comprises an amplitude limiter 42 for limiting the positive and negative amplitudes of the control signals to produce amplitude limited signals, an integrator or accumulator 43 for integrating or accumulating therein the amplitude limited signals to produce an integrated signal, a digital-to-analog converter 44 for converting the integrated signal into an analog voltage, and means for supplying the analog voltage to the voltage-controlled oscillator 36 to control the repetition frequency. The amplitude limiter 42 is preferred to avoid a sudden change in the repetition frequency and may be dispensed with. The digital-to-analog converter 44 is used because use is made in the embodiment being illustrated of digital signals up to the ouput side of the integrator 43.

While this invention has thus far been described in specific conjunction with a preferred and a specific embodiment thereof, it will have been appreciated by those skilled in the art that this invention is applicable to code transmission system which come under the scope of the appended claims. For example, the synchronization codes may not necessarily be produced at an equal interval.

What is claimed is:

1. In a code transmission system which comprises a transmitter and a receiver, said transmitter comprising synchronization means for producing synchronization codes of a predetermined code pattern regularly with respect to time, encoder means coupled to said synchronization means and responsive to information to be transmitted for successively producing information codes representative of said information between two adjacent synchronization codes, a first buffer memory for storing codes supplied thereto, first means coupled to said synchronization and said encoder means and to said first buffer memory for supplying the synchronization and the information codes from said synchronization and said encoder means to said first buffer memory, means coupled to said first buffer memory for reading the codes stored in said first buffer memory to transmit the read out codes at a predetermined transmission rate, and second means coupled to said first buffer memory for producing a first buffer occupancy code indicative of buffer occupancy of said first buffer memory, said receiver comprising a second buffer memory for storing the codes transmitted from said transmitter, decoder means for decoding, at a decoding rate, information codes supplied thereto into an output signal, third means coupled to said second buffer memory and to said decoder means for reading the synchronization and the information codes stored in said second buffer memory to supply the read out codes to said decoder means thereby making said output signal represent said information, and fourth means coupled to said second buffer memory for producing a second buffer occupancy code indicative of buffer occupancy of said second buffer memory, the improvement wherein:

said transmitter further comprises fifth means coupled to said first and said second means and to said first buffer memory for supplying the first buffer occupancy codes from said second means to said first buffer memory in a predetermined relation to the synchronization codes supplied from said synchronization means to said first buffer memory and said receiver further comprises sixth means coupled to said third means for reading the first buffer occupancy codes stored in said second buffer memory, seventh means coupled to said sixth and said fourth means and responsive to the first buffer occupancy codes supplied from said sixth means and to the second buffer occupancy codes supplied from said fourth means for producing, when the buffer occupancy indicated by the supplied second buffer occupancy codes has a difference from a predetermined value, a control signal of an amplitude representative of said difference, and eighth means coupled to said seventh means and to said decoder means and responsive to the amplitude of said control signal for controlling said decoding rate.

2. A code transmission system as claimed in claim 1, wherein said sixth means comprises ninth means for successively retaining the first buffer occupancy codes read out of said second buffer memory and said seventh means comprises tenth means coupled to said seventh and to said fourth means for calculating a sum of each first buffer occupancy code retained by said ninth means and a second buffer occupancy code supplied from said fourth means while said each first buffer occupancy code is retained by said seventh means, eleventh means for retaining a predetermined constant, and twelfth means coupled to said tenth and said eleventh means for producing said control signal when said sum is different from said predetermined constant.

3. A code transmission system as claimed in claim 2, wherein said eighth means comprises a clock coupled to said decoder means for supplying clock pulses of a repetition frequency to said decoder means, counter means coupled to said clock, to said decoder means, and to said seventh means for supplying said decoder means with synchronizing signals having a phase relation controlled by the amplitude of said control signal relative to the synchronization codes read out of said second buffer memory, and frequency control means coupled to said clock and to said seventh means for controlling said repetition frequency in response to said control signal.

4. A code transmission system as claimed in claim 3, wherein said seventh means further comprises a register coupled to said twelfth means and to said counter means for registering the control signals in response to said synchronizing signals, said counter means comprises a pulse counter coupled to said clock and to said decoder means for supplying the synchronizing signal to said decoder means each time when said pulse counter counts a predetermined number, an amplitude monitor retaining a positive and a negative reference amplitude and coupled to said register for producing a first and a second control output when the amplitudes of the control signals exceed in absolute values said positive and negative reference amplitudes, respectively, and means coupled to said pulse counter and to said amplitude monitor for increasing and decreasing said predetermined number in response to one and the other of said first and second control outputs, respectively, and said frequency control means comprises an integrator for integrating input signals to produce an integrated signal, thirteenth means for supplying said control outputs to said integrator as said input signals, and means coupled to said clock and to said integrator for controlling said repetition frequency in response to said integrated signal.

5. A code transmission system as claimed in claim 4, wherein said thirteenth means comprises an amplitude limiter coupled to said register and to said integrator for limiting the amplitude of said control signal to supply amplitude limited signals to said integrator as said input signals.

* * * * *